(12) United States Patent
Shin (10) Patent No.: US 9,377,898 B2
(45) Date of Patent: Jun. 28, 2016

(54) METHOD OF CALIBRATING SENSITIVITY OF A TOUCH INPUT DEVICE AND TOUCH INPUT DEVICE EMPLOYING THE SAME

(71) Applicant: Samsung Display Co., LTD., Yongin, Gyeonggi-Do (KR)

(72) Inventor: Ji-Hye Shin, Cheonan-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/453,483

(22) Filed: Aug. 6, 2014

(65) Prior Publication Data

US 2015/0049064 A1 Feb. 19, 2015

(30) Foreign Application Priority Data

Aug. 19, 2013 (KR) ........................ 10-2013-0097623

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ... G06F 3/0418; G06F 3/03547; G06F 3/041; G06F 3/0414; G06F 3/044; G06F 3/045; G06F 2203/04111; G06F 2203/04112
See application file for complete search history.

(56) References Cited

U.S. PATENT DOCUMENTS

| 2004/0154375 | A1 | 8/2004 | Mattes et al. | |
| 2010/0117975 | A1 | 5/2010 | Cho | |
| 2011/0050394 | A1 | 3/2011 | Zhang et al. | |
| 2011/0090175 | A1* | 4/2011 | Mamba | G06F 3/044 345/174 |
| 2013/0147850 | A1* | 6/2013 | Li | G06F 3/0414 345/684 |
| 2014/0023210 | A1* | 1/2014 | Sheng | H04R 3/00 381/114 |

FOREIGN PATENT DOCUMENTS

| KR | 10-2010-0052227 A | 5/2010 |
| KR | 10-1105366 B1 | 1/2012 |
| KR | 10-2012-0047973 A | 5/2012 |

* cited by examiner

*Primary Examiner* — Premal Patel
(74) *Attorney, Agent, or Firm* — Knobbe, Martens, Olson & Bear, LLP (57) ABSTRACT

A method of calibrating sensitivity of a pressure based touch input device is disclosed. In one aspect, the method includes generating continuous input signals each having a value that is based on the magnitude pressure applied to the touch input device and sampling the continuous input signals at a predetermined rate to generate sampling signals. The method also includes determining whether to perform a sensitivity calibration of the touch input device based on a first threshold range and the sampling signals and selecting a sensitivity calibration parameter to be applied to the sensitivity calibration from among a plurality of pre-stored parameters. The selecting is based on the absolute values of the sampling signals. The method further includes performing the sensitivity calibration based on the sensitivity calibration parameter.

20 Claims, 7 Drawing Sheets

FIG. 9 ent title="METHOD OF CALIBRATING SENSITIVITY OF A TOUCH INPUT DEVICE AND TOUCH INPUT DEVICE EMPLOYING THE SAME">

METHOD OF CALIBRATING SENSITIVITY OF A TOUCH INPUT DEVICE AND TOUCH INPUT DEVICE EMPLOYING THE SAME

CROSS-REFERENCE TO RELATED APPLICATIONS

This application claims priority under 35 USC §119 to Korean Patent Applications No. 10-2013-0097623, filed on Aug. 19, 2013 in the Korean Intellectual Property Office (KIPO), the contents of which are incorporated herein in its entirety by reference.

BACKGROUND

1. Field

The described technology generally relates to a touch input device, and more particularly, to a method of calibrating the sensitivity of a touch input device and a touch input device employing the same.

2. Description of the Related Technology

Touch input devices that can detect a touch input signal when a user touches a screen with a finger or a pen are widely used. Generally, touch input devices can be divided into two categories: capacitive touch input devices that detect the touch input signal based on a change in capacitance and resistive touch input devices that detect a touch input signal based on pressure. Since resistive touch input devices detect touch input signals by detecting a physical change induced by pressure, the devices typically require a restoration time during which the physical change is restored to its initial state.

SUMMARY OF CERTAIN INVENTIVE ASPECTS

One inventive aspect is a method of calibrating the sensitivity of a touch input device capable of finely determining the state of the touch input device by using different parameters according to the magnitudes of pressure applied to the device and capable of accurately detecting a touch input signal based on the determined state of the touch input device.

Another aspect is a touch input device employing the method of calibrating the sensitivity of the touch input device.

Another aspect is a method of calibrating the sensitivity of a touch input device, the method including generating continuous input signals each having a value that is determined according to the magnitude of pressure applied to the device, generating sampling signals by sampling the continuous input signals at a predetermined frame rate, determining whether to perform a sensitivity calibration of the touch input device based on a first threshold range and the sampling signals, determining a sensitivity calibration parameter to be applied to the sensitivity calibration from among a plurality of pre-stored parameters based on the absolute values of the sampling signals when the sensitivity calibration is performed, and performing the sensitivity calibration based on the sensitivity calibration parameter.

The determining of whether to perform the sensitivity calibration may include calculating the difference between a value of an (N)th sampling signal and a value of an (N−1)th sampling signal, generating state data (hereinafter to be interchangeably used with status data) for the touch input device based on the difference and the first threshold range, and determining whether to perform the sensitivity calibration based on the state data.

The generating of the state data may include determining whether the difference is negative, and determining whether the difference is in the first threshold range.

The determining of the sensitivity of the calibration parameter may include sequentially comparing the absolute value of an (N)th sampling signal with pre-stored first through (M)th reference values, and selecting a parameter corresponding to the (M)th reference value as the sensitivity calibration parameter when the absolute value of the (N)th sampling signal is greater than or substantially equal to the (M)th reference value.

The performing of the sensitivity calibration may include setting the value of the (N)th frame signal as a reference level and changing the first threshold range to a second threshold range based on the sensitivity calibration parameter.

The second threshold range increases as variations in the continuous input signals increase.

The deciding of whether to perform the sensitivity calibration may include selecting signals each having a value greater than a third threshold value, calculating a difference between a value of an (N)th sampling signal and a value of an (N−1)th sampling signal, generating state data of the touch input device based on the first threshold range and the difference, and determining whether to perform the sensitivity calibration based on the state data.

The generating of the state data may include determining whether the difference is negative and determining whether the difference is in the first threshold range.

The performing of the sensitivity calibration may include setting the value of the (N)th frame signal as a reference level, changing the third threshold value to a fourth threshold value based on the sensitivity calibration parameter, and changing the first threshold range to a second threshold range based on the sensitivity calibration parameter.

The second threshold range increases as variations in the continuous input signals increase and the fourth threshold value is the value of the (N)th frame signal plus the third threshold value.

Another aspect is a touch input device that detects a touch input signal based on applied pressure, the touch input device may include a pressure sensor having a first electrode layer, an elastic member and a second electrode layer, and a control unit.

The elastic member may be disposed on the first electrode layer, the second electrode layer may be disposed on the elastic member, and the second electrode layer may oppose the first electrode layer.

The control unit may be formed to perform a sensitivity calibration of the touch input device based on the magnitude of the pressure.

The pressure sensor detects the touch input signal based on a change in capacitance based on the magnitude of the pressure.

The control unit may generate continuous input signals each having a value that is determined according to the magnitude of the pressure, may generate sampling signals by sampling the continuous input signals at a predetermined frame rate, may decide whether to perform a sensitivity calibration of the touch input device based on a first threshold range and the sampling signals, may determine a sensitivity calibration parameter to be applied to the sensitivity calibration from among a plurality of pre-stored parameters based on the absolute values of the sampling signals when the sensitivity calibration is performed, and may perform the sensitivity calibration based on the sensitivity calibration parameter.

The control unit may calculate the difference between a value of an (N)th sampling signal and a value of an (N−1)th sampling signal, may generate state data of the touch input device based on the difference and the first threshold range, and may determine whether to perform the sensitivity calibration based on the state data.

The control unit may sequentially compare the absolute value of an (N)th sampling signal with pre-stored first through (M)th reference values when the sensitivity calibration is performed, may select a parameter corresponding to the (M)th reference value as the sensitivity calibration parameter when the absolute value of the (N)th sampling signal is greater than or substantially equal to the (M)th reference value, may set the value of the (N)th frame signal as a reference level, and may change the first threshold range to a second threshold range based on the sensitivity calibration parameter.

The control unit may select signals each having a value greater than a third threshold value, may calculate the difference between a value of an (N)th sampling signal and a value of an (N−1)th sampling signal, may generate state data of the touch input device based on the first threshold range and the difference, and may determine whether to perform the sensitivity calibration based on the state data.

The control unit may sequentially compare the absolute value of an (N)th sampling signal with pre-stored first through (M)th reference values when the sensitivity calibration is performed, may select a parameter corresponding to the (M)th reference value as the sensitivity calibration parameter when the absolute value of the (N)th sampling signal is greater than or substantially equal to the (M)th reference value, may set the value of the (N)th sampling signal as a reference level, may change the third threshold value to a fourth threshold value based on the sensitivity calibration parameter, and may change the first threshold range to a second threshold range based on the sensitivity calibration parameter.

According to at least one embodiment, a method of calibrating the sensitivity of a touch input device may determine a sensitivity calibration parameter to be applied to the sensitivity calibration based on the magnitude of applied pressure, and may finely calibrate sensitivity of the touch input device based on the sensitivity calibration parameter.

In addition, according to at least one embodiment, a touch input device may detect a touch input signal based on applied pressure and may finely perform a sensitivity calibration based on the magnitude of the pressure. Thus, the touch input device may accurately detect the touch input signal even when the touch input device is in a restoration state.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF CERTAIN INVENTIVE EMBODIMENTS

The standard resistive touch input device detects touch input signals by detecting a physical change induced by pressure, and therefore, the device requires a restoration period during which the physical change is restored to its initial state. Consequently, the standard resistive touch input device may not detect an additional touch input signal during the restoration period. In addition, resistive touch input devices can erroneously recognize a restoration signal as a touch input signal (i.e., may mistake the restoration signal for the touch input signal). Particularly, when a flexible display device includes a resistive touch input device, the input device can have a relatively long restoration time because it is required to be formed with a flexible material having characteristics that result in a relatively long restoration period.

Various embodiments will be described more fully hereinafter with reference to the accompanying drawings, in which some exemplary embodiments are shown. The described technology may, however, be embodied in many different forms and should not be construed as limited to the embodiments set forth herein. Rather, these embodiments are provided so that this disclosure will be thorough and complete, and will fully convey the scope of the described technology to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the described technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the described technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
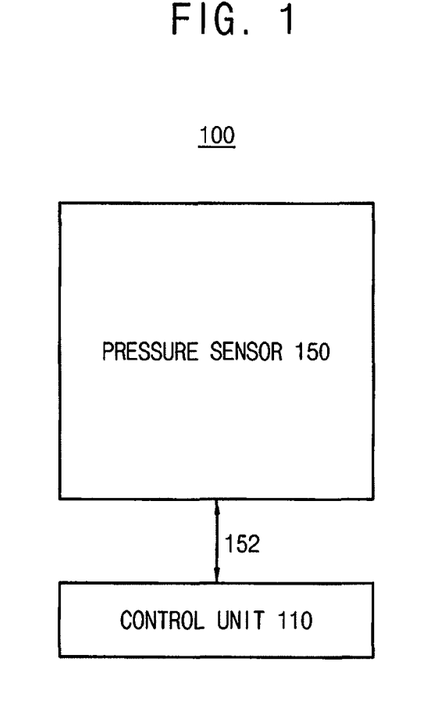
FIG. 1 is a block diagram illustrating a touch input device according to an embodiment.
Figure 2:
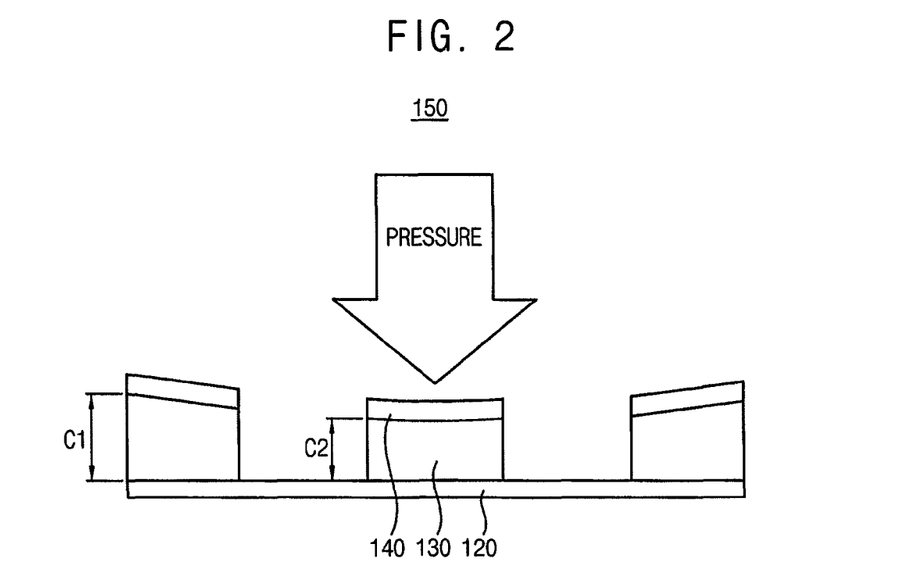
FIG. 2 is a cross-sectional view illustrating an example of a pressure sensor included in the touch input device of FIG. 1.

FIG. 1 is a block diagram illustrating a touch input device according to an embodiment. FIG. 2 is a cross-sectional view illustrating an example of a pressure sensor included in the touch input device of FIG. 1.

Referring to FIGS. 1 and 2, the touch input device 100 includes a pressure sensor 150 and a control unit (or controller) 110 that controls the pressure sensor 150.

The touch input device 100 may be a touch screen panel that is combined with a display panel. The touch input device 100 may detect a touch input signal when a user directly touches a screen. Generally, the touch input device 100 is classified into one of two categories: capacitive touch input devices or resistive touch input devices. A capacitive touch input device detects a touch input signal based on a change in capacitance (e.g., a change in electrostatics induced when a finger touches the screen). A resistive touch input device detects a touch input signal based on pressure (e.g., a physical change induced by pressure applied to the touch input device). The described technology may provide new type of touch input device 100. The touch input device 100 may detect the touch input signal by detecting a change in a gap (i.e., distance, space, etc) between two layers that are opposite each other when pressure is applied to the two layers.

The pressure sensor 150 functions as a detector that detects a touch input signal in the touch input device 100. The pressure sensor 150 may include a first electrode layer 120, an elastic member 130 disposed on the first electrode layer 120, and a second electrode layer 140 disposed on the elastic member 130, where the second electrode layer 140 opposes the first electrode layer 120.

The first electrode layer 120 may include a conductive material. In some embodiments, the first electrode layer 120 includes a substantially transparent conductive material. For example, the first electrode layer 120 may include an indium zinc oxide (IZO), an indium tin oxide (ITO), a gallium tin oxide, a zinc oxide (ZnOx), a gallium oxide (GaOx), a tin oxide (SnOx), an indium oxide (InOx), or a combination thereof. According to some embodiments, the first electrode layer 120 includes a plurality of electrodes arranged in a predetermined pattern. For example, the electrodes may be arranged in a predetermined direction. In addition, the electrodes may have a quadrangle shape, a circular shape, a triangular shape, a rhombus shape, etc.

The elastic member 130 may be disposed on the first electrode layer 120. The elastic member 130 may have electrically insulating properties. When the touch input device 100 is used as the touch screen of a display panel, the elastic member 130 may include a substantially transparent insulator. According to some embodiments, the elastic member 130 is disposed on a portion of the first electrode layer 120 as illustrated in FIG. 2. According to some embodiments, when the first electrode layer 120 includes electrodes that are arranged in a predetermined direction and the second electrode layer 140 opposing the first electrode layer 120 includes electrodes that are arranged in a direction substantially perpendicular to the predetermined direction, the elastic member 130 is disposed in locations corresponding to the intersections between the electrodes of the first and second electrode layers 120 and 140. According to other embodiments, the elastic member 130 may be disposed to substantially cover the entire surface of the first electrode layer 120.

The second electrode layer 140 may include the same material or a similar material as the first electrode layer 120. For example, the second electrode layer 140 may include a transparent conductive material such as an IZO, an ITO, a gallium tin oxide, a zinc oxide, a gallium oxide, a tin oxide, an indium oxide, etc, used alone or a in a combination thereof. According to some embodiments, the second electrode layer 140 includes a plurality of electrodes that are arranged in a predetermined pattern. For example, the electrodes may be arranged in a direction substantially perpendicular to the predetermined direction in which the electrodes of the first electrode layer 120 are arranged. The electrodes may have a quadrangle shape, a circular shape, a triangular shape, a rhombus shape, etc.

When pressure is applied to the pressure sensor 150, the control unit 110 may determine the location to which the pressure is applied and may measure the magnitude of the touch input signal. That is, the control unit 110 may control the pressure sensor 150. The control unit 110 may include an integrated circuit (IC) chip. The control unit 110 may further include well-known elements which can perform various calculations based on electrical signals.

The touch input device 100 may be applied to the touch screen panel of a flexible display. In these cases, the pressure sensor 150 may be flexible due to the inclusion of a flexible metal film, a flexible polymer film, a flexible glass, etc. According to some embodiments, when pressure is applied to the pressure sensor 150, the pressure sensor 150 is physically deformed as illustrated in FIG. 2. For example, due to such the flexibility of the pressure sensor 150, a gap C2 between the first and second electrode layers 120 and 140 to which the pressure is applied is narrower than a gap C1 to which the pressure is not applied. The pressure sensor 150 may detect the physical deformation (i.e., a physical change) as a touch input signal. For example, the pressure sensor 150 may detect a change in capacitance according to a change in the gap between the first and second electrode layers 120 and 140. Specifically, the capacitance may be represented by [Equation 1] below.

$$C = \varepsilon \frac{A}{t}$$ [Equation 1]

Here, "C" denotes capacitance, "A" denotes the respective areas of two electrodes that are opposite to each other, "t" denotes the thickness or distance between the two electrodes, and "∈" denotes the dielectric permittivity of the capacitor. As shown in [Equation 1], the capacitance is inversely proportional to the gap between the first and second electrode layers 120 and 140. Accordingly, the greater the pressure applied to the pressure sensor 150, the narrower the gap between the first and second electrode layers 120 and 140 (i.e., the gap between the first and second electrode layers 120 and 140 becomes narrower as larger pressures are applied to the pressure sensor 150). As a result, the capacitance is increased.

Alternatively, when the pressure is relieved, the gap between the first and second electrode layers 120 and 140 may be restored by the elastic force of the elastic member 130 disposed between the first and second electrode layers 120 and 140. As a result, the capacitance is substantially restored to its original value. In this case, the restoration time may depend on the elastic force of the elastic member 130. Specifically, in the case that the pressure sensor 150 is flexible, the restoration time tends to be relatively long. Thus, the touch input device 100 may erroneously detect a signal during the restoration period as a touch input signal (i.e., may mistake the signal during the restoration period for the touch input signal) because the capacitance of the pressure sensor 150 remains higher than the initial capacitance of the pressure sensor 150 while the elastic member 130 is restored to its original shape.

To prevent this type of error, the control unit 110 may calibrate the sensitivity of the pressure sensor 150 while the elastic member 130 is restored. Particularly, to accurately perform a sensitivity calibration, the control unit 110 may determine whether the pressure sensor 150 is in a restoration state. However, the restoration time may be different according to the magnitude of the pressure applied to the pressure sensor 150. To accurately distinguish whether the pressure sensor 150 is in a restoration state, determinations may be performed based on the magnitude of the applied pressure. In addition, when pressure is continually applied to the pressure sensor 150, it is difficult to distinguish whether the pressure sensor 150 is in a pressurized state or a restoration state. Thus, the touch input device 100 may accurately distinguish the state of the pressure sensor 150 by using different parameters according to the magnitude of the pressure and may calibrate the sensitivity based on the different parameters.

Figure 3:
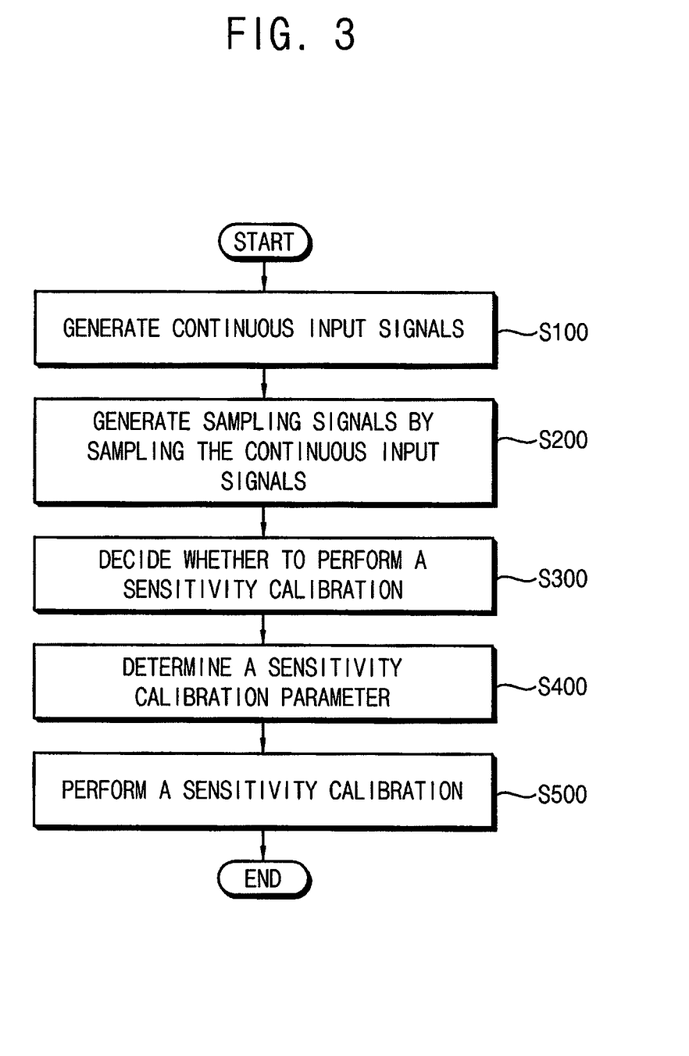
FIG. 3 is a flow chart illustrating a method of calibrating the sensitivity of a touch input device according to an embodiment.

FIG. 3 is a flow chart illustrating a method of calibrating sensitivity of a touch input device according to an embodiment.

In some embodiments, the FIG. 3 procedure is implemented in a conventional programming language, such as C or C++ or another suitable programming language. The program can be stored on a computer accessible storage medium of the touch input device 100, for example, a memory (not shown) of the touch input device 100 or the control unit 110. In certain embodiments, the storage medium includes a random access memory (RAM), hard disks, floppy disks, digital video devices, compact discs, video discs, and/or other optical storage mediums, etc. The program may be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/ 2000/9x/ME/XP, Macintosh OS, OS/2, Android, iOS and the like. In another embodiment, at least part of the procedure can be implemented with embedded software. Depending on the embodiment, additional states may be added, others removed, or the order of the states changed in FIG. 3. The description of this paragraph applies to the embodiments shown in FIGS. 5-7.

Referring to FIG. 3, the method includes generating continuous input signals each having a value that is based on the magnitude of the pressure (S100), generating sampling signals by sampling the continuous input signals at a predetermined frame rate (S200), determining whether to perform a sensitivity calibration of the touch input device based on a first threshold range and the values of the sampling signals (S300), determining a sensitivity calibration parameter to be applied to the sensitivity calibration from among a plurality of pre-stored parameters based on the absolute values of the sampling signals when the sensitivity calibration is performed (S400), and performing the sensitivity calibration based on the sensitivity calibration parameter (S500).

The continuous input signals each have a value that is determined based on the magnitude of the applied pressure and may be generated (S100) by continuously measuring a change in capacitance of the pressure sensor 150. For example, since the capacitance increases as the pressure applied to the pressure sensor 150 increases, the continuous input signals may have higher values than a value of an initial input signal in a state where pressure is not applied, to the pressure sensor 150. According to some embodiments, when the initial capacitance is assumed to have a reference level of about zero, the continuous input signals are generated to have a positive (+) value when pressure is applied to the pressure sensor 150. According to other embodiments, when the initial capacitance is assumed to have a reference level of about zero, the continuous input signals are generated to have a negative (−) value when pressure is applied to the pressure sensor 150.

Figure 4:
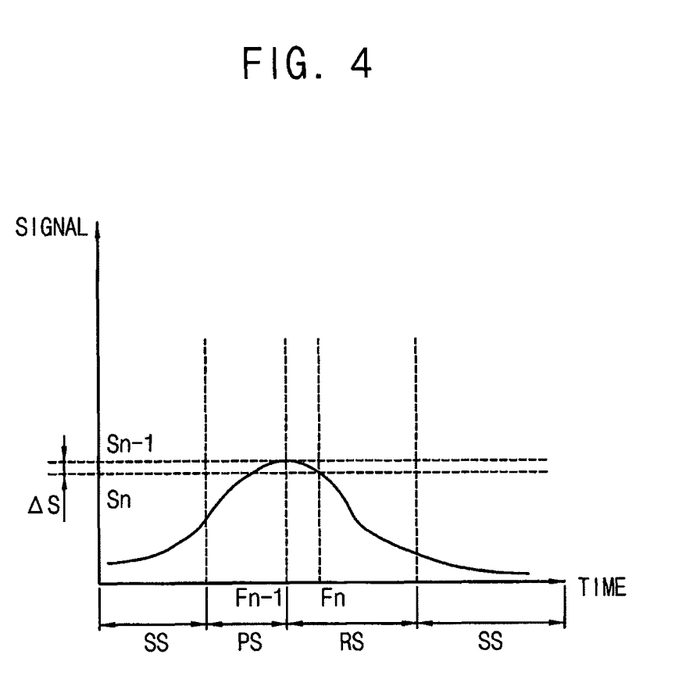
FIG. 4 is a graph illustrating an example of continuous input signals generated by the method of FIG. 3.

FIG. 4 is a graph illustrating an example of continuous input signals generated by the method of FIG. 3.

Referring to FIG. 4, the continuous input signals may be generated as a curve increasing gradually while pressure is applied to the pressure sensor 150 and decreasing while the pressure applied to the pressure sensor 150 is relieved. Here, the initial capacitance of the touch input device 100 is assumed to be about zero as the reference level.

The continuous input signals may be generated to have a positive (+) value when the pressure is applied to the pressure sensor 150. When the pressure is applied to the pressure sensor 150, the values of the continuous input signals may be changed. When a relatively large pressure is applied to the pressure sensor 150, the continuous input signals may sharply increase. The continuous input signals may continuously increase while the pressure is applied to the pressure sensor 150. In this section of the graph of FIG. 4, the touch input device 100 is in a pressurized state. Thus, this section is defined as a pressure state section PS. When the applied pressure is relieved from the pressure sensor 150, the previously compressed pressure sensor 150 is restored to an initial state. Thus, in this section of the graph of FIG. 4, the continuous input signals return to the reference level. Accordingly, this section is defined as a restoration state section RS. After the pressure sensor 150 is substantially completely restored, the continuous input signals are substantially constant. Thus, this section is defined as a steady state section SS. However, the steady state section SS refers not only to a section where the pressure is not applied to the pressure sensor 150 but also to a section where a constant pressure is continuously applied to the pressure sensor 150. In other words, the steady state section SS refers to all sections where the continuous input signals are substantially constant.

The method of FIG. 3 includes generating the continuous input signals (S100) based on the touch input signal received from the pressure sensor 150, as illustrated in FIG. 4. The method of FIG. 3 may include generating sampling signals by sampling the continuous input signals at a predetermined frame rate (S200). The predetermined frame rate is not limited to a specific rate. As the frame rate decreases, more sensitive measurements are possible. The method of FIG. 3 may include sampling the continuous input signals at the predetermined frame rate and the method of FIG. 3 may include determining whether to perform a sensitivity calibration of the touch input device 100 based on the sampling signals. For example, the method of FIG. 3 may include generating the sampling signals by sampling the continuous input signals as illustrated in FIG. 4. In FIG. 4, a value Sn of an (N)th frame Fn signal (or an (N)th sampling signal) is less than a value Sn−1 of an (N−1)th frame Fn−1 signal (or an (N−1) the sampling signal). The difference Sn−(Sn−1) between the value Sn and the value Sn−1 is represented as ΔS in FIG. 4. Since the continuous input signals decrease as time passes, ΔS has a negative (−) value in FIG. 4. In other words, Sn is less than Sn−1. The (N)th frame Fn and the (N−1)th frame Fn−1 are in the restoration state section RS of the pressure sensor 150. In the restoration state section RS, the difference between two values of two adjacent sampling signals is negative (−).

Figure 5:
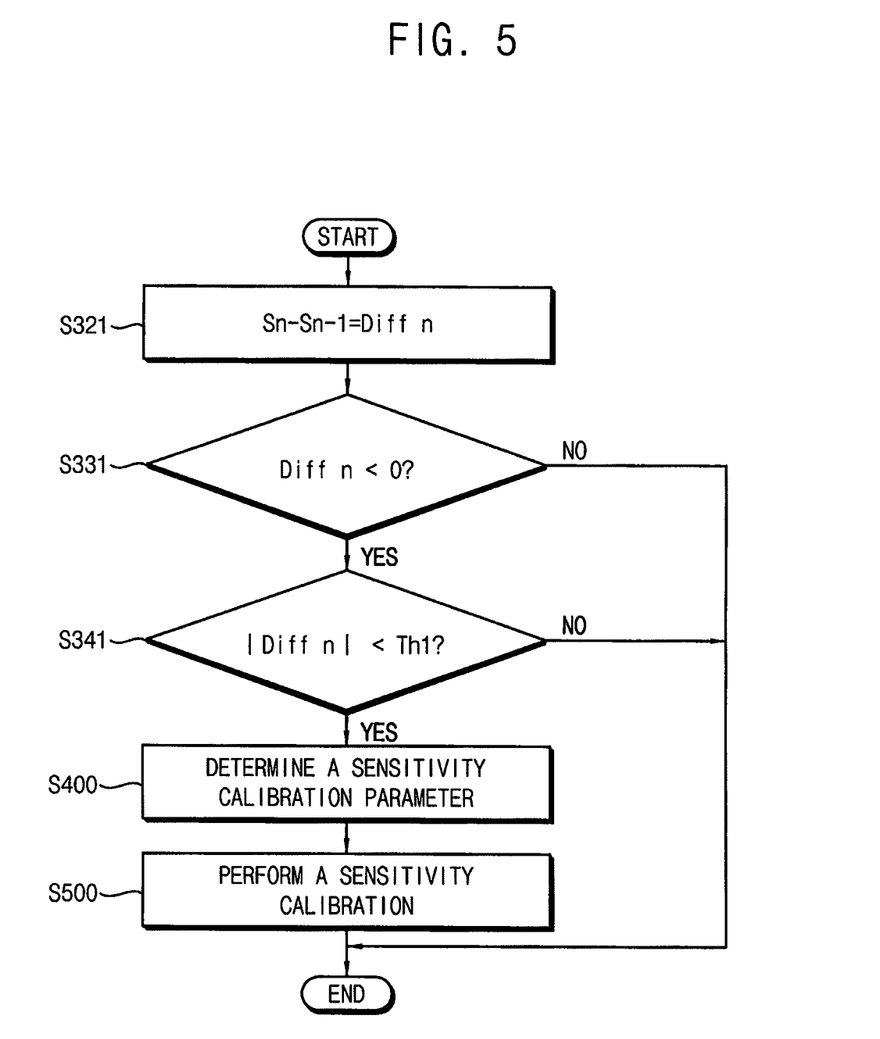
FIG. 5 is a flow chart illustrating an embodiment in which the method of FIG. 3 includes determining whether to perform a sensitivity calibration.

FIG. 5 is a flow chart illustrating an embodiment in which the method of FIG. 3 includes determining whether to perform a sensitivity calibration.

Referring to FIG. 5, the method of FIG. 3 may include determining whether to perform the sensitivity calibration by calculating the difference between the value Sn of an (N)th frame signal and the value Sn−1 of an (N−1)th frame signal from among the sampling signals (S321), determining whether the difference Diff n is negative (S331) and comparing the absolute value of the difference Diff n with a first threshold range Th1 when the difference Diff n is negative (S341).

In some embodiments, the sensitivity calibration of the touch input device 100 is performed when the applied pressure is relieved and the pressure sensor 150 is restored to the initial state. The touch input device can determine when the pressure sensor 150 is in a steady state section SS in which pressure is not applied to the pressure sensor 150 by measuring a change in capacitance based on an initial capacitance. Thus, the sensitivity calibration is not required in a steady state section SS. In addition, when the pressure sensor 150 is in a pressure state section PS in which pressure is applied to the pressure sensor 150, the sensitivity calibration is also not required. However, when the pressure sensor 150 is in a restoration state section RS in which the pressure applied to the pressure sensor 150 is relieved and the pressure sensor 150 is restored to an initial state, the sensitivity calibration is required in order to prevent errors in the touch input device 100. Therefore, before performing the sensitivity calibration, it is determined whether the pressure sensor 150 is in the restoration state section RS.

As mentioned above, when pressure is applied to the pressure sensor 150, the gap between the first and second electrode layers 120 and 140 decreases and the capacitance of the pressure sensor 150 increases. Accordingly, the values of the continuous input signals also increase. On the other hand, when the pressure is relieved, the pressure sensor 150 is restored to an initial state and the capacitance of the pressure sensor 150 returns to an initial capacitance. Accordingly, the values of the continuous input signals also return to an initial value. As illustrated in FIG. 4, in the pressure state section PS the value of the continuous input signal increases while pressure is applied to the pressure sensor 150. In the restoration state section RS the value of the continuous input signal decreases while pressure is relieved and the pressure sensor 150 returns to an initial state.

In addition, in the steady state section SS the continuous signal is substantially constant. Thus, by analyzing a change in the values of the continuous input signal (i.e., analyzing a difference between two values of the continuous input signal) it can be determined whether the pressure sensor 150 is in the restoration state section RS. Thus, the method of FIG. 3 may include selecting two adjacent frame signals among the sampling signals and calculating the difference between the two values (S321). For example, if an (N)th frame Fn and an (N−1)th frame Fn−1 are selected for the method of FIG. 3, the difference between the value Sn of the (N)th frame Fn signal and the value Sn−1 of the (N−1)th frame Fn−1 signal (S321) is calculated, the difference Diff n is stored in the control unit 110, the state data of the touch input device 100 is generated based on the absolute value of the difference Diff n and a pre-stored first threshold range Th1, and it is determined whether to perform the sensitivity calibration based on the state data (S331 and S341).

For example, the method of FIG. 3 may include determining whether the difference Diff n is negative (S331). If the difference Diff n is positive (+), the pressure sensor 150 is in the pressure state section PS, as mentioned above. If the difference Diff n is about zero (0), the pressure sensor 150 is in the steady state section SS. If the difference Diff n is negative (−), the pressure sensor 150 is in the restoration state section RS or the steady state section SS. Therefore, it may be determined that the sensitivity calibration of the touch input device 100 is not required when the difference Diff n is about zero (0) or is positive (+). However, when the difference Diff n is negative (−), the method of FIG. 3 may determine whether to perform the sensitivity calibration of the touch input device 100 by comparing the absolute value of the difference Diff n to the first threshold range Th1 (S341).

As described above, the pressure sensor 150 may not be in the restoration state section RS, even when the difference Diff n is negative (−). For example, when a constant pressure is applied to the pressure sensor 150, a small change in pressure may be measured, or the continuous input signal may include electrical noise. Thus, ideal constant continuous signals may not be generated. Accordingly, even when the difference Diff n is negative (−), it is possible that the pressure sensor 150 may be in the steady state section SS in which a constant pressure including a small change in pressure is applied to the pressure sensor 150. In addition, even when the difference Diff n is negative (−), it is also possible that the pressure sensor 150 may be in a steady state section SS when there is electrical noise in the continuous signal.

Therefore, the method of FIG. 3 may include comparing the difference Diff n with the first threshold range Th1 (S341) in order to accurately determine whether the pressure sensor 150 is in the restoration state section RS. The first threshold range Th1 may be selected as a predetermined value (i.e., the first threshold value Th1 is not limited) in consideration of the electrical noise and the change in pressure when a constant pressure is applied to the pressure sensor 150. The method of FIG. 3 may accurately determine whether the pressure sensor 150 is in the restoration state section RS by comparing the difference Diff n with the first threshold value Th1 and the method of FIG. 3 may include determining whether to perform the sensitivity calibration based on the determined state of the pressure sensor 150. For example, the method of FIG. 3 may include comparing an absolute value of the difference Diff n with the first threshold value Th1 (S341). If the difference Diff n is less than the first threshold value Th1 (i.e., if the absolute value of the difference |Diff n| is less than the first threshold value Th1), the pressure sensor 150 is in the steady state section SS where a constant pressure is applied to the pressure sensor 150 or there is electrical noise in the continuous signal. In this case, the method of FIG. 3 does not perform the sensitivity calibration. However, when the pressure sensor 150 is in the restoration state section RS, the difference Diff n between a value Sn of the (N)th frame Fn signal and a value Sn−1 of the (N−1)th Fn−1 signal may be relatively large and the difference Diff n may be greater than the first threshold value Th1. Therefore, in this case, the method of FIG. 3 may include performing the sensitivity calibration of the touch input device 100.

Figure 6:
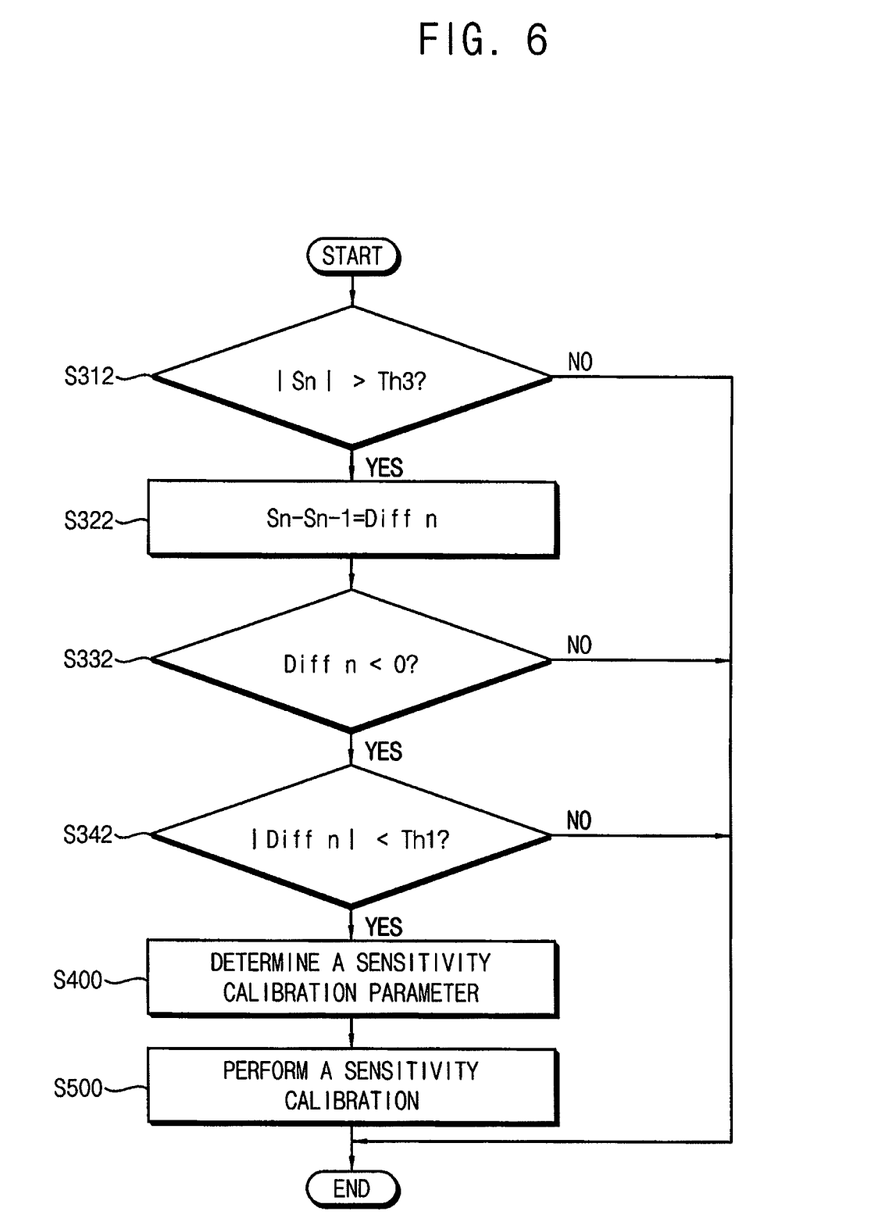
FIG. 6 is a flow chart illustrating another embodiment in which the method of FIG. 3 includes determining whether to perform a sensitivity calibration.

FIG. 6 is a flow chart illustrating another embodiment in which the method of FIG. 3 includes determining whether to perform a sensitivity calibration.

Referring to FIG. 6, the method of FIG. 3 may include determining whether to perform the sensitivity calibration by selecting signals which have a value greater than a third threshold value from among the sampling signals (S312), calculating a difference between a value Sn of an (N)th frame signal and a value Sn−1 of an (N−1)th frame signal from among the selected signals (S332), determining whether the difference is negative (S332), and determining whether to perform the sensitivity calibration of the touch input device 100 by comparing an absolute value of the difference Diff n with a first threshold range Th1 (S342).

The example of FIG. 6 is similar to the example of FIG. 5 except that only signals each having a value greater than a third threshold value are selected from among the sampling signals (S312).

According to the present embodiment, the method of FIG. 3 does not directly calculate the difference Diff n between a value Sn of an (N)th frame Fn signal and a value Sn−1 of an (N−1)th frame Fn−1 signal, but selects signals each having a value greater than a third threshold value Th3 from among the sampling signals (S312). The method includes calculating the difference Diff n between the value Sn of the (N)th frame Fn signal and the value Sn−1 of an (N−1)th frame Fn−1 signal from among the selected signals (S322). For example, there may be electrical noise in the signal when the pressure sensor 150 is in the steady state section SS, as mentioned above. Accordingly, the values of the continuous input signals may fluctuate due to the electrical noise in the steady state section SS. The third threshold value Th3 may be pre-stored, and may be selected so that the electrical noise is not erroneously detected as the touch input signal in consideration of the magnitude of the fluctuations in the continuous input signals.

According to some embodiments, the method of FIG. 3 may include generating sampling signals by sampling the continuous input signals at a predetermined frame rate and determining whether to perform the sensitivity calibration when a sampling signal having a greater value than the third threshold value Th3 is detected from among the sampling signals. Particularly, the method of FIG. 3 may include calculating the difference Diff n between the value Sn of the (N)th frame Fn signal and the value Sn−1 of the (N−1)th frame Fn−1 signal that are greater than the third threshold value Th3 (S322). When the difference Diff n is negative (−) (S332) the method includes determining whether to perform the sensitivity calibration by determining whether the difference Diff n is in the first threshold range Th1 (S342). Each method of determination is substantially the same as the corresponding method in the embodiment of FIG. 5. Thus, description related to the same operations will not be repeated.

Figure 7:
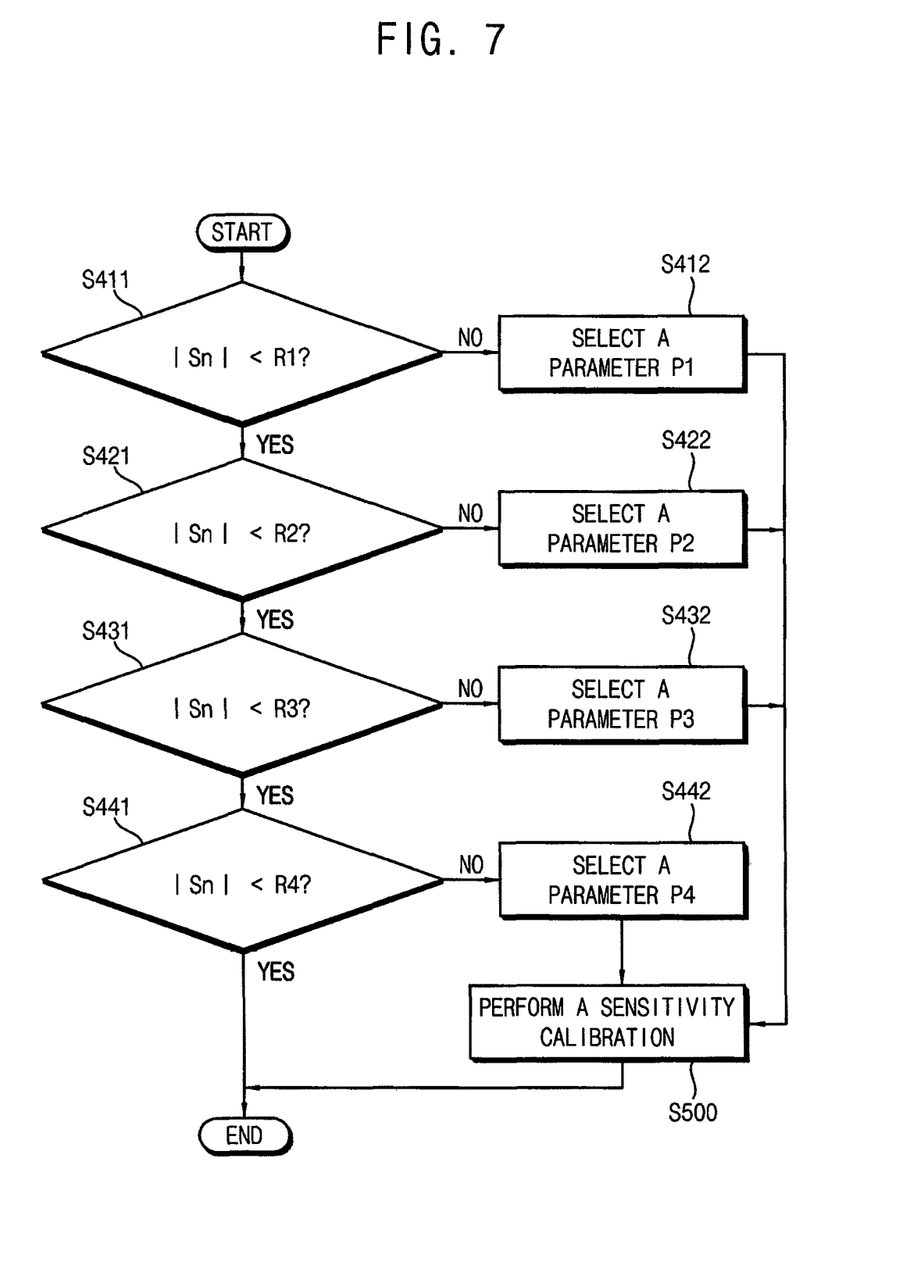
FIG. 7 is a flow chart illustrating an embodiment in which the method of FIG. 3 includes determining a sensitivity calibration parameter to be applied to the sensitivity calibration.

FIG. 7 is a flow chart illustrating an embodiment in which the method of FIG. 3 includes determining a sensitivity calibration parameter to be applied to a sensitivity calibration.

Referring to FIG. 7, the method of FIG. 3 includes sequentially comparing an absolute value |Sn| of an (N)th frame Fn signal with pre-stored first R1 through (M)th reference values (S411, S421, S431 and S441) and selecting a parameter corresponding to the (M)th reference value as the sensitivity calibration parameter when the absolute value |Sn| of the (N)th frame Fn signal Fn is greater than or substantially equal to the (M)th reference value (S412, S422, S432, and S442).

The restoration time of the pressure sensor 150 may vary according to the magnitude of an applied pressure. If relatively large pressure is applied, the restoration time may become relatively longer. Since the pressure sensor 150 is restored to its initial state during the restoration time, the capacitance of the pressure sensor 150 during the restoration time may be greater than the capacitance of the pressure sensor 150 in the initial state. In this case, the control unit 110 may erroneously detect a change in capacitance during the restoration time as a new touch input signal. Thus, to substantially prevent these errors from occurring in the touch input device 100, the method of FIG. 3 may include setting a value of the predetermined frame signal as a reference level. Here, "a reference level" means a value of signal corresponding to an initial capacitance of the pressure sensor 150 when pressure is not applied to the pressure sensor 150. However, setting the reference level is periodically required until the pressure sensor 150 is substantially completely restored to the initial state. In other words, when a relatively large pressure is applied to the pressure sensor 150, the change in the continuous input signals is relatively large and the restoration time is relatively long. Accordingly, in order to detect a new touch input signal accurately during the restoration time, the setting of the reference level is periodically required.

Prior to the setting, the method of FIG. 3 may include repeatedly determining whether to perform the sensitivity calibration as in the embodiments of FIGS. 5 and 6. In this case, the method of FIG. 3 includes comparing the difference Diff n between two values of two adjacent frame signals with the first threshold range Th1. However, if a fixed first threshold range Th1 is used to decide whether to perform the sensitivity calibration, the control unit 110 may not detect relatively small pressures because the difference Diff n for relatively small pressures is less than the fixed first threshold range Th1. In other words, the control unit 110 may erroneously determine the relatively small pressure to be electrical noise.

To substantially prevent this type of error, the method of FIG. 3 may include changing the first threshold range Th1 to another range according to the magnitude of the pressure. According to some embodiments, the method of FIG. 3 may include sequentially comparing the absolute value |Sn| of an (N)th frame Fn signal with pre-stored reference values R1, R2, R3 and R4 (S411, S421, S431 and S441). For example, as illustrated in FIG. 7, when four reference values R1, R2, R3 and R4 are pre-stored, the method of FIG. 3 includes sequentially comparing the absolute value |Sn| of the (N)th frame Fn signal with first through fourth reference values R1 to R4. If the absolute value |Sn| of the (N)th frame Fn signal is greater than or substantially equal to the first reference value R1, the method of FIG. 3 includes selecting a parameter P1 corresponding to the first reference value R1 as a sensitivity calibration parameter (S412) and changing the first threshold range Th1 to a second threshold range Th2 based on the sensitivity calibration parameter P1 (S500).

The sensitivity calibration parameter P1 may include data about the second threshold range Th2 that is selected as the predetermined range according to the restoration time. Therefore, the method of FIG. 3 includes changing the first threshold range Th1 to the second threshold range Th2 based on the sensitivity calibration parameter P1. The second threshold range Th2 may be applied as a reference range to determine whether to perform the sensitivity calibration at the next frame. In addition, if the absolute value |Sn| of the (N)th frame Fn signal is less than the first reference value R1, the method of FIG. 3 includes comparing the absolute value |S0| with a second reference value R2 (S421). In this case, the second reference value R2 is less than the first reference value R1. If the absolute value |Sn| is greater than or substantially equal to the second reference value R2, the method of FIG. 3 includes selecting a parameter P2 corresponding to the second reference value R2 as a sensitivity calibration parameter (S422) and changing the first threshold range Th1 to a third threshold range based on the sensitivity calibration parameter P2 (S500). The third threshold range may be less than the second threshold range Th2.

In the same manner, if the absolute value |Sn| of the (N)th frame Fn signal is less than the second reference value R2, the method of FIG. 3 includes comparing the absolute value |Sn| with a third reference value R3 (S431). In this case, the third reference value R3 is less than the second reference value R2. If the absolute value |Sn| is greater than or substantially equal to the third reference value R3, the method of FIG. 3 includes selecting a parameter P3 corresponding to the third reference value R3 as a sensitivity calibration parameter (S432) and changing the first threshold range Th1 to a fourth threshold range based on the sensitivity calibration parameter P3 (S500). The fourth threshold range may be less than the third threshold range.

In the same manner, the method of FIG. 3 includes comparing the absolute value ISO of the (N)th frame Fn signal with a fourth reference value R4 (S441). In this case, the first threshold range Th1 may be changed to another range. The other range may be applied as a reference range to determine whether to perform the sensitivity calibration at the next frame. Therefore, as the absolute value |Sn| of the (N)th frame Fn signal decreases, the first threshold range Th1 may be decreased to a relatively smaller range. In other words, the method of FIG. 3 may include accurately determining whether to perform the sensitivity calibration by changing the first threshold range Th1 to determine whether to perform the sensitivity calibration at another range. In this way, the touch input device 100 may accurately detect the touch input signal even though another pressure is applied while the pressure sensor 150 is restored to an initial state.

Figure 8:
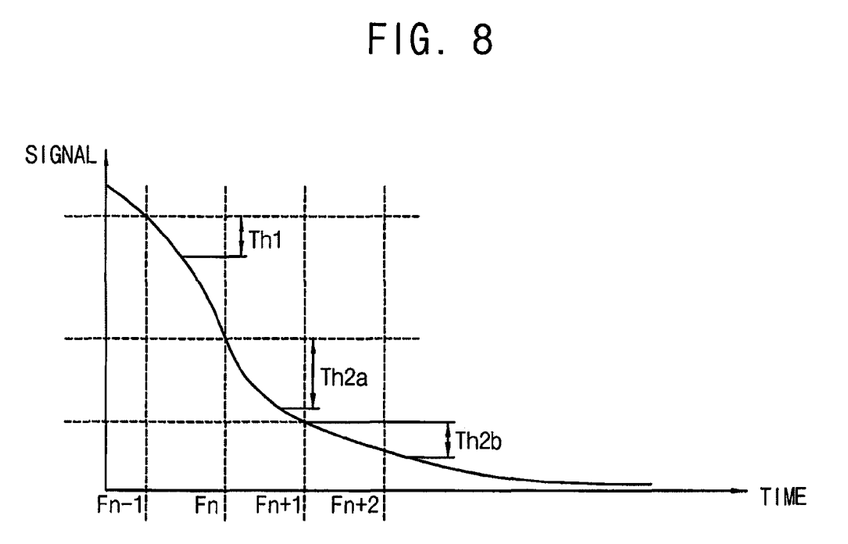
FIG. 8 is a graph illustrating an embodiment in which the method of FIG. 3 includes performing a sensitivity calibration of a touch input device when a relatively large pressure is applied to the touch input device.

FIG. 8 is a graph illustrating an embodiment in which the method of FIG. 3 includes sensitivity calibration of a touch input device when a relatively large pressure is applied to the touch input device.

Referring to FIG. 8, when a relatively large pressure is applied to the touch input device 100, the difference between the value of an (N)th frame Fn signal and the value of an (N−1)th frame Fn−1 signal is relatively large in the restoration state section RS of the pressure sensor 150. However, the difference between the values of next two frame signals may become relatively smaller as the restoration period is processed. Thus, the method of FIG. 3 includes performing the sensitivity calibration periodically in consideration of the restoration period.

For example, the method of FIG. 3 may include deciding whether to perform the sensitivity calibration at the (N)th frame Fn based on the first threshold range Th1 and determining whether to perform the sensitivity calibration at an (N+1)th frame Fn+1 based on a second (A) threshold range Th2a. In other words, if the difference between the value of the (N)th frame Fn signal and the value of the (N−1)th frame Fn−1 signal is not in the first threshold range Th1, the method of FIG. 3 includes setting a value of the (N)th frame Fn signal as a reference level and changing the first threshold range Th1 to the second (A) threshold range Th2a. In this case, the second (A) threshold range Th2a is a reference range used to determine whether to perform the sensitivity calibration at the (N+1)th frame Fn+1 and the second (A) threshold range Th2a is a predetermined range based on the value of the (N)th frame Fn signal. If the value of the (N)th frame Fn signal is relatively large, the difference between the value of the (N+1)th frame Fn+1 signal and the value of the (N)th frame Fn signal is also relatively large.

Accordingly, the method of FIG. 3 may include changing the first threshold range Th1 to the second (A) threshold range Th2a that has a relatively broader range than the first threshold range Th1. The second (A) threshold range Th2a is pre-stored as a sensitivity calibration parameter corresponding to the value of the (N)th frame Fn signal. The method of FIG. 3 may include selecting the sensitivity calibration parameter corresponding to the value of the (N)th frame Fn signal as in the embodiment of FIG. 7. Therefore, the method of FIG. 3 may accurately determine whether to perform the sensitivity calibration of the touch input device 100 by changing the first threshold range Th1 to the suitable second (A) threshold range Th2a according to the value of the (N)th frame Fn signal.

In addition, when an additional pressure is applied to the pressure sensor 150 while the pressure sensor 150 is restored, the continuous input signals may be increased sharply compared to a restoration signals. The difference between two values of continuous two frame signals may be positive (+). In this case, the method of FIG. 3 may include accurately distinguishing an additional touch input signal from the restoration signal by the embodiment of FIGS. 5 and 6.

Referring to FIG. 8 again, after sensitivity calibration, the method of FIG. 3 may include repeatedly determining whether to perform the sensitivity calibration at the (N+1)th frame Fn+1. In this case, the absolute value of the difference between the (N+1)th frame Fn+1 signal and the (N)th frame Fn signal may be compared to the second (A) threshold range Th2a. For example, if the absolute value is not in the second (A) threshold range Th2a, the method of FIG. 3 may include setting the value of the (N+1)th frame Fn+1 signal to the reference level and changing the second (A) threshold range Th2a to a second (B) threshold range Th2b that is a reference range used to determine whether to perform the sensitivity calibration at an (N+2)th frame Fn+2. The second (B) threshold range Th2b is pre-stored as a sensitivity calibration parameter corresponding to the value of the (N+1)th frame Fn+1 signal.

The method of FIG. 3 may include selecting the sensitivity calibration parameter corresponding to the value of the (N+1)th frame Fn+1 signal by the embodiment of FIG. 7. In this case, the second (B) threshold range Th2b may have relatively narrower range than the second (A) threshold range Th2a. In other words, the threshold range may be changed to another threshold range that has relatively narrower range since the value of the (N+1)th frame Fn+1 signal is less than the value of the (N)th frame signal. Therefore, the method of FIG. 3 may include more accurately detecting an additional touch input signal based on a relatively narrower threshold range.

Figure 9:
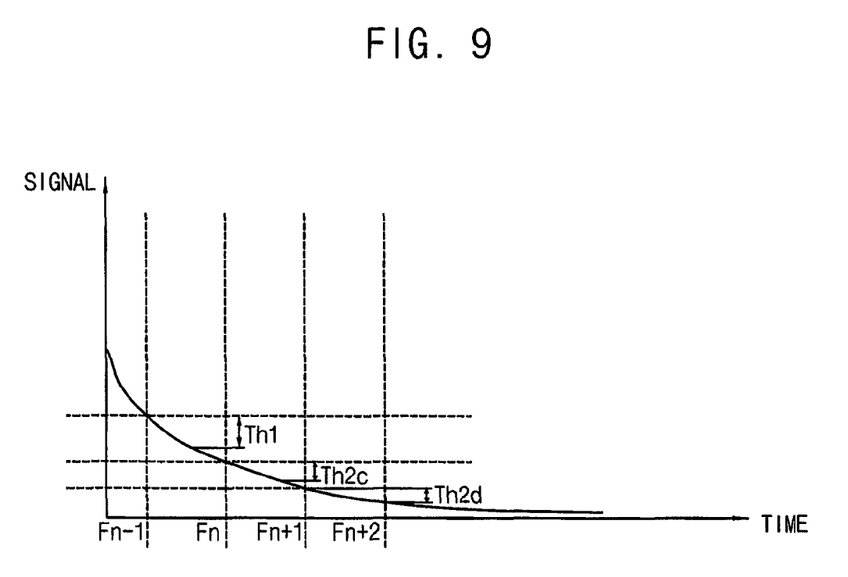
FIG. 9 is a graph illustrating an embodiment in which the method of FIG. 3 includes performing a sensitivity calibration of a touch input device when a relatively small pressure is applied to the touch input device.

FIG. 9 is a graph illustrating an example in which the method of FIG. 3 includes performing a sensitivity calibration of a touch input device when a relatively small pressure is applied to the touch input device.

Referring to FIG. 9, when relatively small pressure is applied to the pressure sensor 150, the method of FIG. 3 may include determining whether to perform the sensitivity calibration by comparing the difference between the value of an (N)th frame Fn signal and the value of an (N−1)th frame Fn−1 signal with a first threshold range Th1. When the sensitivity calibration is performed, the method of FIG. 3 includes setting the value of the (N)th frame Fn signal to a reference level. In addition, the method of FIG. 3 may include changing the first threshold range Th1 to the second (C) threshold range Th2c, in order to accurately detect the touch input signal. In other words, if a relatively small pressure is applied to the pressure sensor 150, the difference between the value of the (N)th frame Fn signal and the value of the (N−1)th frame Fn−1 signal may be relatively small and the difference between the value of an (N+1)th frame Fn+1 signal and the value of the (N)th frame Fn signal may be much smaller.

Accordingly, the method of FIG. 3 may include changing the first threshold range Th1 to the second (C) threshold range Th2c that has relatively narrower range than the first threshold range Th1 in consideration of such a change in the difference. Thus, although a variation in the continuous input signals of the pressure sensor 150 has a relatively small change, the method of FIG. 3 may accurately distinguish an additional touch input signal from the restoration signal based on the second (C) threshold range Th2c that has relatively narrower range than the first threshold range Th1.

Similarly, the method of FIG. 3 may include deciding whether to perform the sensitivity calibration based on the difference between the value of the (N+1)th frame Fn+1 signal and the value of the (N)th frame Fn signal, setting the value of the (N+1)th frame Fn+1 signal as the reference level when the sensitivity calibration is performed, and changing the second (C) threshold range Th2c to another threshold range that is suitable to be applied to determine whether to perform the sensitivity calibration at the next frame (i.e., an (N+2)th frame Fn+2). For example, the second (C) threshold range Th2c may be changed to a second (D) threshold range Th2d that has relatively narrower range than the second (C) threshold range Th2c. As a result, the method of FIG. 3 may accurately distinguish an additional touch input signal from the restoration signal by changing the threshold range according to the value of predetermined frame signal.

According to some embodiments, the method of FIG. 3 includes determining whether to perform the sensitivity calibration by selecting signals each having a value greater than a third threshold value Th3 among the sampling signals by the example of FIG. 6. The sensitivity calibration may be performed by a method substantially similar to the embodiments of FIGS. 8 and 9. Particularly, the method of FIG. 3 may include determining whether to perform the sensitivity calibration by comparing a difference between a value of an (N)th frame Fn signal and a value of an (N−1)th frame Fn−1 value with a first threshold range Th1. When the sensitivity calibration is performed, the method of FIG. 3 may include setting the value of the (N)th frame Fn as a reference level, and changing the first threshold range Th1 to a second threshold range that is a reference range used to determine whether to perform the sensitivity calibration at an (N+1)th frame Fn+1.

In addition, the method of FIG. 3 may include changing the third threshold value Th3 to a fourth threshold value Th4. The third threshold value Th3 is a reference value which can distinguish the touch input signal from electrical noise. When setting the value of the (N)th frame Fn signal as the reference level, the third threshold value Th3 needs to be changed. Thus, the method of FIG. 3 may include changing the third threshold value Th3 to the fourth threshold value Th4. For example, the fourth threshold value Th4 may be the value of the (N)th frame Fn signal plus the third threshold value Th3. In this case, the method of FIG. 3 may accurately distinguish an additional touch input signal from the restoration signal although the pressure sensor 150 is in the restoration state section.

Although a number of embodiments have been described those skilled in the art will readily appreciate that many modifications are possible in the example embodiments without materially departing from the novel teachings and advantages of the described technology.

The described technology may be applied to any electronic device (e.g., a cellular phone, a smart-phone, a smart-pad, a personal digital assistant (PDA), a portable multimedia player (PMP), an MP3 player, a television, a game console, etc) that includes a touch input device. For example, the described technology may be applied to a sensor to detect whether a flexible display is bent, or to detect the magnitude of the bending. In addition the described technology may be applied to any device that needs to sensitively detect pressure.

The foregoing is illustrative of embodiments and is not to be construed as limiting thereof. Although a number of embodiments have been described, those skilled in the art will readily appreciate that many modifications are possible in the embodiments without materially departing from the novel teachings and advantages of the described technology. Accordingly, all such modifications are intended to be included within the scope of the described technology as defined in the claims. Therefore, it is to be understood that the foregoing is illustrative of various embodiments and is not to be construed as limited to the specific embodiments disclosed, and that modifications to the disclosed example embodiments, as well as other example embodiments, are intended to be included within the scope of the appended claims.

What is claimed is:

1. A method of calibrating sensitivity of a pressure based touch input device, the method comprising:
    generating a plurality of continuous input signals each having a value that is based at least in part on the magnitude of pressure applied to the touch input device;
    sampling the continuous input signals at a predetermined frame rate so as to generate a plurality of sampling signals;
    determining whether to perform a sensitivity calibration of the touch input device based at least in part on a first threshold range and the sampling signals;
    selecting a sensitivity calibration parameter to be applied to the sensitivity calibration from a plurality of pre-stored parameters, wherein the selecting is performed based at least in part on the absolute values of the sampling signals; and
    performing the sensitivity calibration based at least in part on the selected sensitivity calibration parameter.

2. The method of claim 1, wherein the determining includes:
    calculating the difference between a value of an (N)th sampling signal and a value of an (N−1)th sampling signal;
    generating status data for the touch input device based at least in part on the calculated difference and the first threshold range; and
    determining whether to perform the sensitivity calibration based at least in part on the status data.

3. The method of claim 2, wherein the generating of the status data includes:
    determining whether the difference is negative; and
    determining whether the difference is in the first threshold range.

4. The method of claim 1, wherein the determining includes:
    sequentially comparing the absolute value of an (N)th sampling signal with a plurality of reference values until the absolute value of the (N)th sampling signal is greater than or substantially equal to an (M)th reference value; and selecting a parameter corresponding to the (M)th reference value as the sensitivity calibration parameter.

5. The method of claim 4, wherein the performing includes:
setting the value of the (N)th sampling signal as a reference level; and
changing the first threshold range to a second threshold range based at least in part on the sensitivity calibration parameter.

6. The method of claim 5, wherein the second threshold range increases as variation in the continuous input increases.

7. The method of claim 1, wherein the determining includes:
selecting sampling signals which have a value greater than a third threshold value;
calculating the difference between a value of an (N)th sampling signal and a value of an (N−1)th sampling signal;
generating status data for the touch input device based at least in part on the first threshold range and the calculated difference; and
determining whether to perform the sensitivity calibration based at least in part on the status data.

8. The method of claim 7, wherein the generating of the status data includes:
determining whether the difference is negative; and
determining whether the difference is in the first threshold range.

9. The method of claim 8, wherein the performing includes:
setting the value of the (N)th sampling signal as a reference level;
changing the third threshold value to a fourth threshold value based at least in part on the sensitivity calibration parameter; and
changing the first threshold range to a second threshold range based at least in part on the sensitivity calibration parameter.

10. The method of claim 9, wherein the second threshold range increases as variation in the continuous input signals increases and wherein the fourth threshold value is the sum of the value of the (N)th frame signal and the third threshold value.

11. A pressure based touch input device, comprising:
a pressure sensor configured to sense pressure applied to the touch input device, wherein the pressure sensor comprises i) a first electrode layer, ii) an elastic member formed over the first electrode layer, and iii) a second electrode layer formed over the elastic member, wherein the second electrode layer opposes the first electrode layer; and
a controller configured to generate a plurality of sampling signals at a predetermined frame rate based at least in part on the magnitude of the sensed pressure and perform a sensitivity calibration of the touch input device based at least in part on the sampling signals.

12. The device of claim 11, wherein the pressure sensor is configured to detect a touch input signal based at least in part on a change in capacitance of the pressure sensor created due to the applied pressure.

13. The device of claim 11, wherein the controller is further configured to:
generate a plurality of continuous input signals each having a value that is based at least in part on the magnitude of the pressure;
sample the continuous input signals at the predetermined frame rate to generate the plurality of sampling signals;
determine whether to perform a sensitivity calibration of the touch input device based at least in part on a first threshold range and the sampling signals;
select a sensitivity calibration parameter to be applied to the sensitivity calibration from a plurality of pre-stored parameters based at least in part on the absolute values of the sampling signals; and
perform the sensitivity calibration based at least in part on the sensitivity calibration parameter.

14. The device of claim 13, wherein the controller is further configured to:
calculate the difference between a value of an (N)th sampling signal and a value of an (N−1)th sampling signal;
generate status data for the touch input device based at least in part on the calculated difference and the first threshold range; and
determine whether to perform the sensitivity calibration based at least in part on the status data.

15. The device of claim 13, wherein the controller is further configured to:
sequentially compare the absolute value of an (N)th sampling signal with a plurality of reference values until the absolute value of the (N)th sampling signal is greater than or substantially equal to an (M)th reference value;
select a parameter corresponding to the (M)th reference value as the sensitivity calibration parameter;
set the value of the (N)th frame signal as a reference level; and
change the first threshold range to a second threshold range based at least in part on the sensitivity calibration parameter.

16. The device of claim 13, wherein the controller is further configured to:
select sampling signals which have a value greater than a third threshold value;
calculate the difference between a value of an (N)th sampling signal and a value of an (N−1)th sampling signal;
generate status data for the touch input device based at least in part on the first threshold range and the calculated difference; and
determine whether to perform the sensitivity calibration based at least in part on the status data.

17. The device of claim 16, wherein the controller is further configured to:
sequentially compare the absolute value the (N)th frame signal with a plurality of reference values until the absolute value of the (N)th sampling signal is greater than or substantially equal to an (M)th reference value;
select a parameter corresponding to the (M)th reference value as the sensitivity calibration parameter;
set the value of the (N)th frame signal as a reference level;
change the third threshold value to a fourth threshold value based at least in part on the sensitivity calibration parameter; and
change the first threshold range to a second threshold range based at least in part on the sensitivity calibration parameter.

18. A method of calibrating sensitivity of a pressure based touch input device, comprising:
generating a plurality of sampling signals at a predetermined frame rate based at least in part on the magnitude of pressure applied to the touch input device;
determining whether to perform a sensitivity calibration of the touch input device based at least in part on the sampling signals;
selecting a sensitivity calibration parameter to be applied to the sensitivity calibration from a plurality of pre-stored parameters, wherein the selecting is prepared based at least in part on the absolute values of the sampling signals; and performing the sensitivity calibration based at least in part on the sensitivity calibration parameter.

19. The method of claim 18, wherein the generating comprises:

generating a plurality of continuous input signals each having a value that is based at least in part on the magnitude of the pressure applied to the touch input device; and sampling the continuous input signals at a predetermined frame rate.

20. The method of claim 18, wherein the determining comprises:

calculating the difference between a value of an (N)th sampling signal and a value of an (N−1)th sampling signal;

generating status data for the touch input device based at least in part on the difference and a first threshold range; and determining whether to perform the sensitivity calibration based at least in part on the status data.

* * * * *